United States Patent
Katz

(10) Patent No.: US 10,357,675 B1
(45) Date of Patent: Jul. 23, 2019

(54) ADJUSTABLE EXERCISE DEVICE

(71) Applicant: Brian Katz, Brooklyn, NY (US)

(72) Inventor: Brian Katz, Brooklyn, NY (US)

( * ) Notice: Subject to any disclaimer, the term of this patent is extended or adjusted under 35 U.S.C. 154(b) by 186 days.

(21) Appl. No.: 15/589,625

(22) Filed: May 8, 2017

Related U.S. Application Data

(63) Continuation-in-part of application No. 14/844,847, filed on Sep. 3, 2015, now Pat. No. 9,675,829.

(60) Provisional application No. 62/045,766, filed on Sep. 4, 2014.

(51) Int. Cl.
| | |
|---|---|
| A63B 1/00 | (2006.01) |
| A63B 21/068 | (2006.01) |
| A63B 21/00 | (2006.01) |
| A63B 23/02 | (2006.01) |
| A63B 23/12 | (2006.01) |

(52) U.S. Cl.
CPC .............. *A63B 1/00* (2013.01); *A63B 21/068* (2013.01); *A63B 21/4035* (2015.10); *A63B 23/02* (2013.01); *A63B 23/1218* (2013.01); *A63B 23/1236* (2013.01); *A63B 2210/50* (2013.01)

(58) Field of Classification Search
CPC .. A63B 1/00; A63B 1/005; A63B 1/04; A63B 3/00; A63B 23/1218; A63B 23/1227; A63B 23/1236; A63B 21/0724; A63B 21/0728; A63B 21/078; A63B 23/1209–1227
See application file for complete search history.

(56) References Cited

U.S. PATENT DOCUMENTS

| | | | |
|---|---|---|---|
| 1,905,112 A | | 4/1933 | Lang |
| 2,690,628 A | * | 10/1954 | Courtney ............... B65H 51/14 19/244 |
| 2,817,522 A | | 12/1957 | Margulies |
| 3,218,065 A | * | 11/1965 | Anderson ................ A63B 9/00 182/182.4 |
| 3,232,609 A | * | 2/1966 | Nissen ..................... A63B 3/00 482/42 |
| 3,475,020 A | | 10/1969 | Schauerte |
| 4,804,064 A | | 2/1989 | Coultrup et al. |

(Continued)

FOREIGN PATENT DOCUMENTS

| | | | | |
|---|---|---|---|---|
| DE | 372386 C | * | 3/1923 | ............. A63B 1/005 |
| FR | 2690628 A1 | * | 11/1993 | ............... A63B 3/00 |

(Continued)

*Primary Examiner* — Nyca T Nguyen
(74) *Attorney, Agent, or Firm* — Goldstein Law Offices, P.C.

(57) ABSTRACT

An exercise device, having a pair of supports that rest upon a ground surface and a bridge that extends between the supports and is elevated above the ground surface. The supports each include an upper support that includes an upper tube and a lower support that includes a central post that together telescope so as to adjust the height of the bridge. Handgrips are selectively attachable to the bridge for allowing the user to perform various exercises. The lower supports are each T-shaped, including a base member and each have a pair of lateral supports that are deployable to stabilize the base members from side movement. The upper tubes and bridge are connected with folding joints, and one of the supports includes an offset portion to facilitate selectively bending the supports upwardly against the bridge for compact storage of the device.

9 Claims, 8 Drawing Sheets

(56) References Cited

U.S. PATENT DOCUMENTS

| | | | |
|---|---|---|---|
| 5,290,209 A | 3/1994 | Wilkinson | |
| 5,547,443 A | 8/1996 | Chen | |
| 5,569,123 A * | 10/1996 | Creatchman | A63B 21/00047 482/39 |
| 5,689,999 A * | 11/1997 | Wiley | A61G 5/12 74/527 |
| 5,954,156 A | 9/1999 | Cooke | |
| 6,168,548 B1 * | 1/2001 | Fleming | A63B 3/00 482/23 |
| 6,203,473 B1 | 3/2001 | Atwood | |
| 6,564,903 B2 | 5/2003 | Krajec | |
| 6,692,417 B2 | 2/2004 | Burrell | |
| 7,108,636 B1 * | 9/2006 | Garcia | A63B 21/1627 482/139 |
| 7,364,530 B2 | 4/2008 | Lopez | |
| 7,658,699 B1 | 2/2010 | Johnson, Jr. | |
| 7,682,298 B2 | 3/2010 | Croft | |
| 8,079,915 B2 | 12/2011 | Spencer et al. | |
| 8,267,840 B2 | 9/2012 | Barnes | |
| 8,317,664 B2 | 11/2012 | Gorsuch et al. | |
| 8,961,374 B2 | 2/2015 | Davidow et al. | |
| 9,993,710 B1 * | 6/2018 | McCoy | A63B 69/0095 |
| 2002/0082145 A1 | 6/2002 | Hamilton | |
| 2005/0130806 A1 | 6/2005 | Lopez | |
| 2009/0023566 A1 * | 1/2009 | Florczak | A63B 1/00 482/142 |
| 2010/0190612 A1 * | 7/2010 | Cook | A63B 71/023 482/38 |
| 2011/0183823 A1 * | 7/2011 | Priday | A63B 21/00047 482/131 |
| 2012/0085380 A1 * | 4/2012 | Buckley | B63B 17/02 135/140 |
| 2013/0172157 A1 * | 7/2013 | Glickstein | A63B 21/068 482/96 |
| 2013/0237394 A1 | 9/2013 | Fowler | |

FOREIGN PATENT DOCUMENTS

| | | |
|---|---|---|
| WO | WO2006014964 | 2/2006 |
| WO | WO2009109793 | 9/2009 |

* cited by examiner

ADJUSTABLE EXERCISE DEVICE

CROSS-REFERENCE TO RELATED APPLICATIONS

This application is a continuation-in-part of utility patent application Ser. No. 14/844,847, filed in the United States Patent Office on Sep. 3, 2015, which is a nonprovisional utility application of provisional patent application Ser. No. 62/045,766 filed in the United States Patent Office on Sep. 4, 2014, claims priority therefrom, and are expressly incorporated herein by reference in their entirety.

TECHNICAL FIELD

The present disclosure relates generally to fitness equipment. More particularly, the present disclosure relates to an adjustable exercise device.

BACKGROUND

The health benefits of physical exercise are widely known. A pull-up bar is traditionally used for a variety of upper-body and core exercises wherein a user lifts at least their own bodyweight. Such movement promotes muscle development, specifically that of the arms, core, and back. However, when the user is not properly trained in the use of the pull-up bar, serious injury can result. Further, a novice and/or an intermediate user is often unable to lift his or her own bodyweight to complete a full pull-up, resulting in further injury when a pull-up is improperly attempted.

As a result, the typical user will often modify the pull-up exercise using fitness devices that are currently marketed. Some of these devices include both large units of weight equipment and small devices intended to build strength within the targeted muscle groups.

Nevertheless, the user is often inconvenienced by drawbacks that are frequently associated with the home use of such devices, such as bulkiness, lack of durability, and a limited exercise range. Further, this strength training equipment is often very expensive to purchase for home use and therefore, inaccessible to many people.

For instance, one such device includes a pull-up bar and a pair of grips which secure to a door frame for the user to do a pull-up in the doorway. However, such device is often not sufficiently anchored around the door frame. As a result, the device typically collapses from the door frame with the user suspended therefrom, injuring the user when the device falls to the ground. Further, the collapsing device often causes costly property damage to the door frame and home. Yet further, because the device is typically positioned over and around the top of the door frame, the user is often unable to perform a modified pull-up wherein less than all their bodyweight is lifted.

Yet further, existing pull-up devices are often not easily tailored to any single user's arm length, height, or skill level. Resultantly, the user often suffers an injury, such as shoulder pain or dislocation, when performing the pull-up improperly.

Still further, the pull-up devices found in a gym setting are not easily used within the home due to the bulkiness and weightiness of the devices. Additionally, the user is often unaware of where gyms are located when traveling. As a result, the user often enlists the services of a personal trainer who can visit the user's home or hotel room. Although some portable pull-up devices have been developed to accommodate the frustrated user, such devices are similarly associated with bulkiness and a limited range of exercise. Both the user and the personal trainer could benefit from having a pull-up fitness device that is easily portable, compatible with modified pull-up regimens, comprised of minimal components, and which can enable a wide range of exercises.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment is to provide an exercise device which can be used as a portable, comprehensive fitness solution. Accordingly, an aspect of an example embodiment in the present disclosure provides an exercise device that is collapsible for easy storage. To facilitate easy folding and compact storage, the upper support mechanisms are attached to the bridge with folding joints and one of the support mechanisms has an offset portion.

Another aspect of an example embodiment is to provide an adjustable exercise device which transitions easily between different heights for use within variable forms of fitness training. Accordingly, an aspect of an example embodiment in the present disclosure provides an exercise device with an upper tube and a central post that extends within the upper tube, which can be selectively extended and contracted for performing exercises of various types and with variable intensity.

A further aspect of an example embodiment is to provide an exercise device which enables an array of hand gripping positions by a user for performing modified fitness exercises, especially for allowing a variety of exercise positions. Accordingly, an aspect of an example embodiment in the present disclosure provides an exercise device that includes handgrips that are selectively attachable to the bridge in various positions for selectively targeting different muscle groups depending on the placement of a user's hands when exercises are performed.

Yet a further example embodiment is to provide an exercise device which is sufficiently anchored to a surface when a user exerts force onto the cross bar. Accordingly, an aspect of an example embodiment in the present disclosure provides the exercise device with lateral leg supports that are selectively deployable perpendicularly to the base support to further stabilize the base support.

Accordingly, the present disclosure describes an exercise device, having a pair of supports that rest upon a ground surface and a bridge that extends between the supports and is elevated above the ground surface. The supports each include an upper support that includes an upper tube and a lower support that includes a central post that together telescope so as to adjust the height of the bridge. Handgrips are selectively attachable to the bridge for allowing the user to perform various exercises. The lower supports are each T-shaped, including a base member and each have a pair of lateral supports that are deployable to stabilize the base members from side movement. The upper tubes and bridge are connected with folding joints, and one of the supports includes an offset portion to facilitate selectively bending the supports upwardly against the bridge for compact storage of the device.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
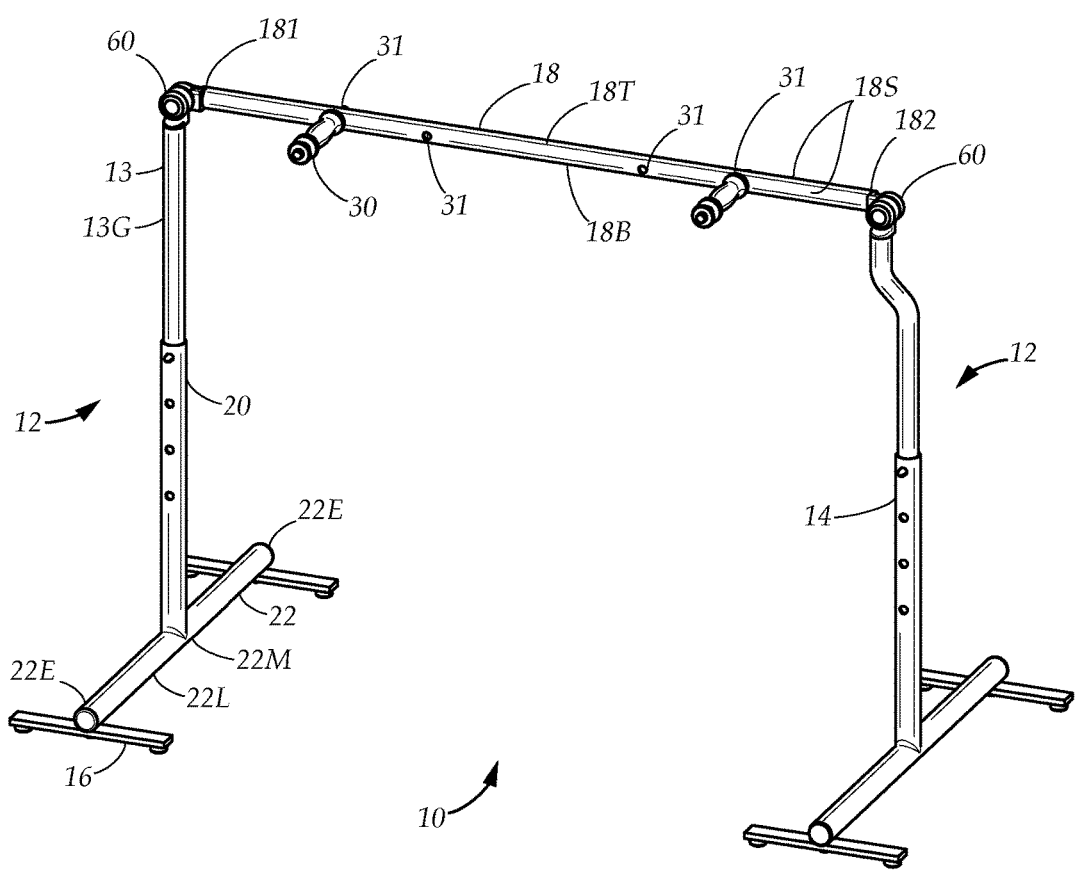
FIG. 1 is diagrammatic perspective view showing an exercise device, per se.

FIG. 1 illustrates an adjustable exercise device 10 used to perform a variety of exercises encompassed in a comprehensive fitness routine. The adjustable exercise device 10 includes a pair of support mechanisms 12 and a bridge 18 extending between each support mechanism 12. The bridge 18 is a cylindrical bar that has a pair of ends 181, 182, with one of the support mechanisms 12 attached at each of the ends. Each support mechanism 12 includes an upper support 13 and a lower support 14. Each upper support 13 includes an upper tube 13G, each upper tube 13G is attached to one of the ends 181, 182 of the bridge 18 with a folding joint 60. The lower support 14 is substantially T-shaped, having a vertically extending central post 20. The central post 20 is tubular such that the upper tube 13G extends within the central post 20 and is telescopically adjustable with respect thereto for adjusting the height of the bridge 18.

Figure 4A:
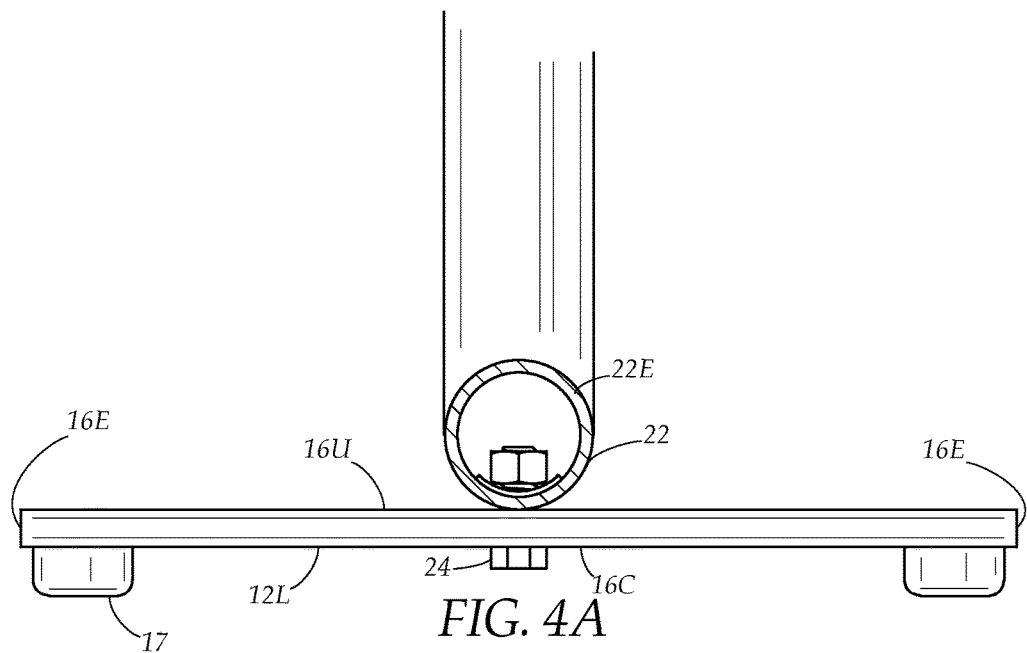
FIG. 4A is a front elevational view, with parts broken away, illustrating one of the lateral leg supports deployed perpendicular to the base member of one of the lower supports.
Figure 4B:
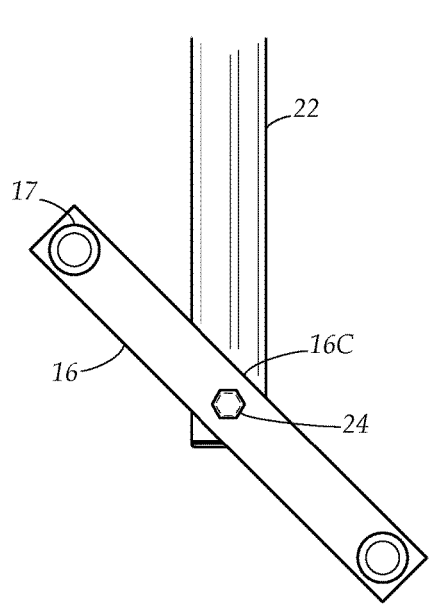
FIG. 4B is a bottom plan view, illustrating one of the lateral leg supports pivoting from its deployed position toward a storage position.
Figure 4C:
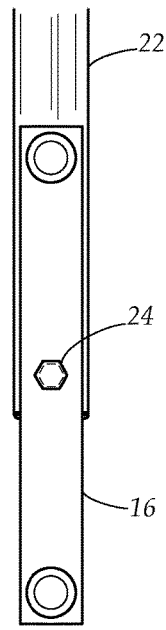
FIG. 4C is a bottom plan view, illustrating one of the lateral leg supports in its storage position.

The lower support 14 also has a horizontally extending base member 22 having a lower surface 22L, a middle 22M and a pair of ends 22E. The central post 20 is secured at the middle of the base member 22. A pair of lateral leg supports 16 are attached to the lower surface 22L near the ends 22E and selectively extend laterally from the base member 22 to provide additional stability thereto so as to prevent axial torsion with respect to the base member 22. FIGS. 4A, 4B, and 4C illustrate the attachment of one of the lateral leg supports 16 to one of the base members 22. In particular, the lateral leg support 16 has a lower surface 16L, an upper surface 16U, a center 16C and a pair of ends 16E. A pair of feet 17 are attached to the lower surface 16L near the ends 16E of the leg support 16 and are preferably made of rubber or a similar material to absorb vibration and prevent damage to a flooring surface upon which the exercise device 10 is utilized. The center 16C of the lateral leg support 16 is pivotally attached to near the end 22E of the base member 22 with a pivot bolt 24. The pivot bolt 24 allows the lateral leg support 16 to be in an extended position as shown in FIG. 4A and FIG. 1, wherein the lateral leg support 16 extends substantially perpendicular to the base member 22 to stabilize the exercise device during use; and pivot axially around the pivot bolt 24 as seen in FIG. 4B toward the storage position of FIG. 4C, wherein the lateral leg support 16 extends coextensively and parallel with the base member 22.

Referring to FIG. 1, while the bridge 18 is generally cylindrical in shape, it has a top edge 18T, a bottom edge 18B, and a pair of side edges 18S. A pair of handgrips 30 are selectively attached to the bridge 18, and extend transversely therefrom such that they extend parallel to the base members 22. The bridge 18 has at least one pair of handgrip attachment holes 31 that extend fully between the side edges 18S to facilitate securing the handgrips 30 therein. Additional handgrip attachment holes 31 may be provided on the bridge 18 to adjust spacing between the handgrips to accommodate different users and different exercises.

Referring to FIGS. 3A, 3B, 3C, and 3D, each handgrip 30 has a molded grip 32 that is shaped to conform to the human hand, and a shaft 34, having a proximal end 34P and a distal end 34D, that extends axially through the molded grip 32 and is sized to extend through one of the handgrip attachment holes 31. The handgrip 30 also has a pair of retaining balls 35 near the distal end 34D that selectively extend outwardly from the shaft 34 for extending against the side surface 18S of the bridge 18 and thereby retain the shaft 34 within the handgrip attachment hole 31 and hold the handgrip 30 securely to the bridge 18.

Figure 3A:
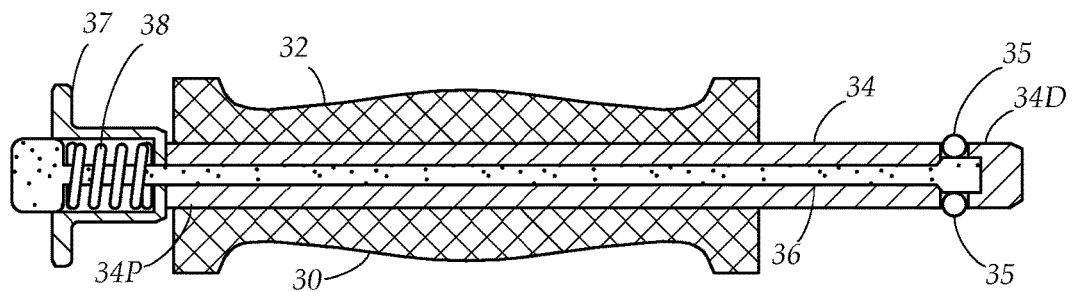
FIG. 3A is a top plan view, with parts broken away, showing one of the handgrips in a secure position.
Figure 3B:
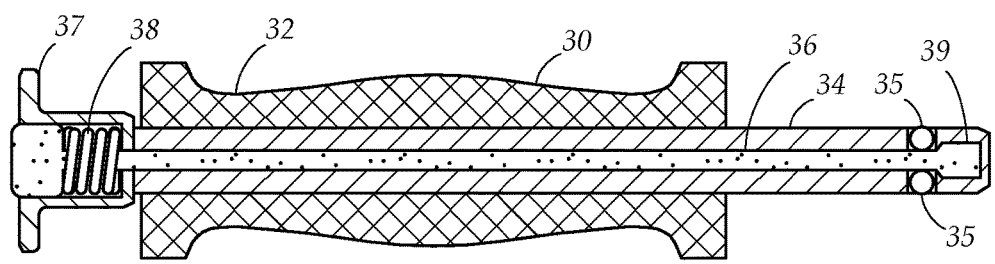
FIG. 3B is a top plan view, with parts broken away, showing one of the handgrips in a release position.
Figure 3C:
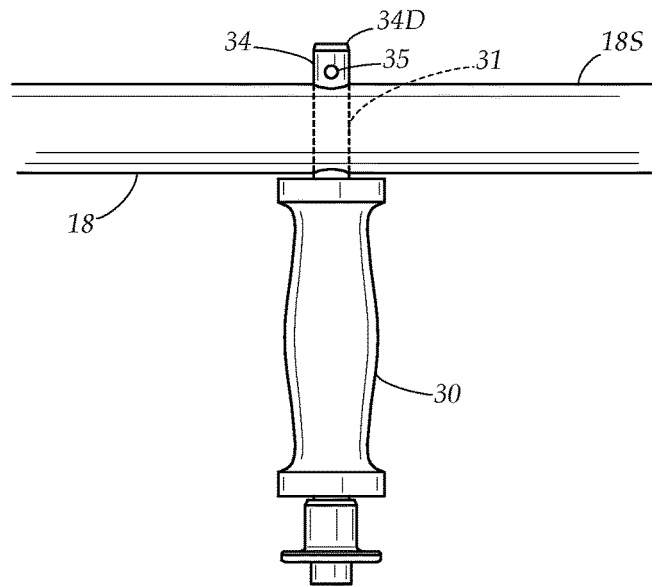
FIG. 3C is a top plan view, showing one of the handgrips secured to the bridge within one of the handgrip attachment holes.
Figure 3D:
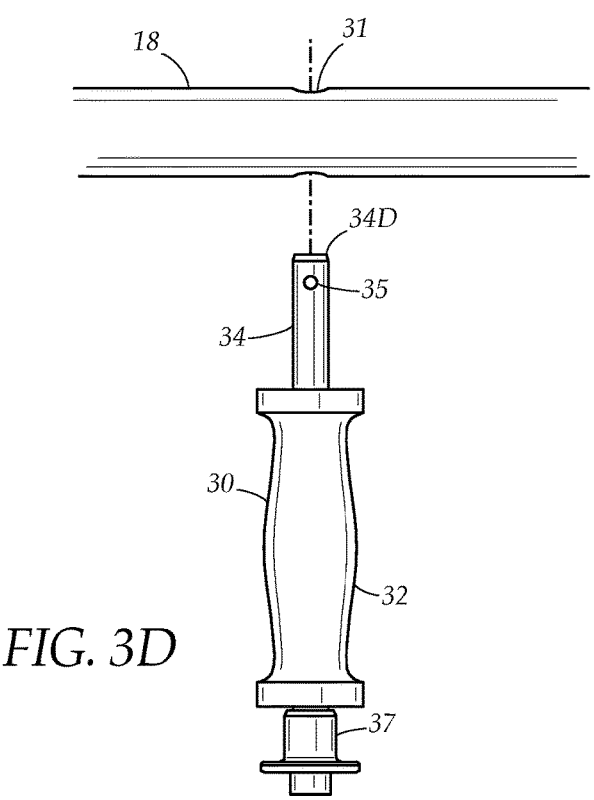
FIG. 3D is a top plan view, showing one of the handgrips removed from the bridge.

While specific operation of the selective positioning of the retaining balls 35 to facilitate its secure position illustrated in FIG. 3A and release position illustrated in FIG. 3B may be accomplished in various ways, in the embodiment illustrated, the handgrip 30 also has a release pin 36 that extends through the shaft 34, and an actuation knob 37. The actuation knob 37 is attached to the proximal end 34D of the shaft 34 and is based against the molded handgrip 32 with a spring 38. The release pin 36 has a cam surface 39 near the distal end of the shaft 34 from the actuation knob 37. The cam surface 39 extends against and interacts with the retaining balls 35 such that the balls 35 are normally positioned by the cam surface 39 into the secure position as illustrated in FIG. 3A for keeping the handgrip 30 secured to the bridge 18 as shown in FIG. 3C. When the actuation knob 37 is pulled away from the molded handgrip 32, the balls 35 can retract inwardly into the shaft 34 to allow the distal end 34D of the shaft 34 to be withdrawn from the bridge 18 as shown in FIG. 3D.

Figures 2A, 2B:
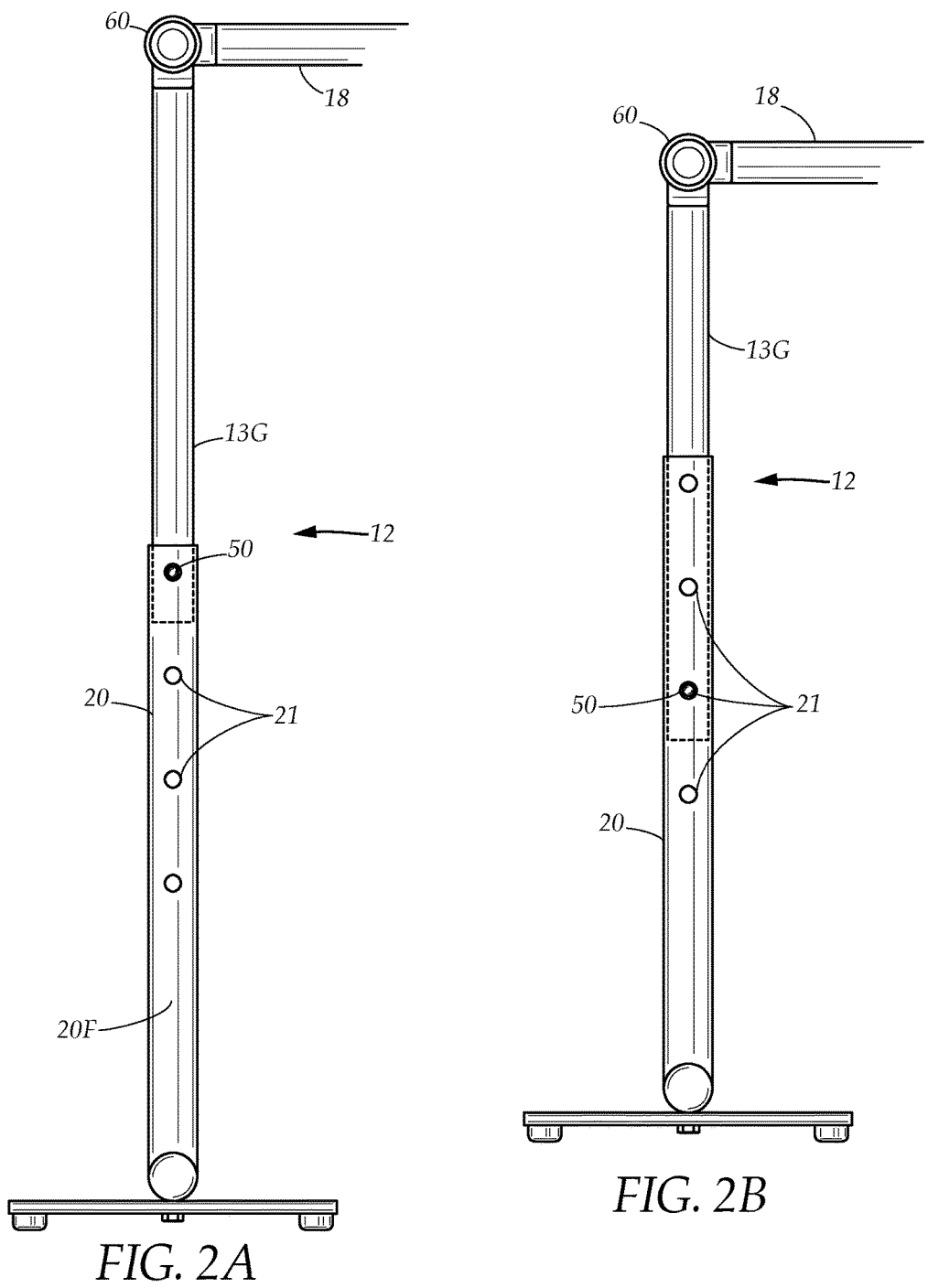
FIG. 2A is a side elevational view, illustrating the use of a height adjustment pin to secure relative positions of the upper tube and central post.
FIG. 2B is a side elevational view similar to FIG. 2A, except wherein the height adjustment pin is employed to secure the relative positions of the upper tube and central post to establish a lower height of the bridge.

Referring now to FIGS. 2A and 2B, the central post 20 has a front 20F having a plurality of height adjustment holes 21. A height adjustment pin 50 is associated with each of the support mechanisms 12 and is selectively inserted through one of the height adjustment holes 21 and into the upper tube 13G to positionally fix the upper tube 13G with respect to the central post 20 and thereby set the height of the bridge 18. In particular, FIG. 2A shows the bridge 18 in a higher position than in FIG. 2B.

To facilitate folding the exercise device 10 for compact storage, the upper posts 13G can selectively lock in position substantially perpendicular to the bridge 18 and selectively fold toward the bridge using the folding joint 60. In particular, a joint that employs a pair of parallel and coaxial discs, one connected to the upper post 13G and the other connected to the bridge 18 is preferable. An example of a suitable folding joint is a rotary locking and unlocking joint sold under the trade name VARILOCK and is described in detail in U.S. Pat. No. 5,689,999. Also facilitating the folding of the exercise device 10, referring to FIG. 5A, one of the upper tubes 13G has an offset portion 65. In particular, the upper tube 13G has a first part 64, a second part 66, and the offset portion 65 in between. The first part 64 is attached to the folding joint 60 and the second part 66 telescopes within the central post 20. The first part 64 is bent with respect to the offset portion 65, and the second part 66 is bent with respect to the offset portion 65. But the first part 64 and second part 66 remain axially parallel to each other and are merely offset in axial position by the offset portion 65.

Figure 5A:
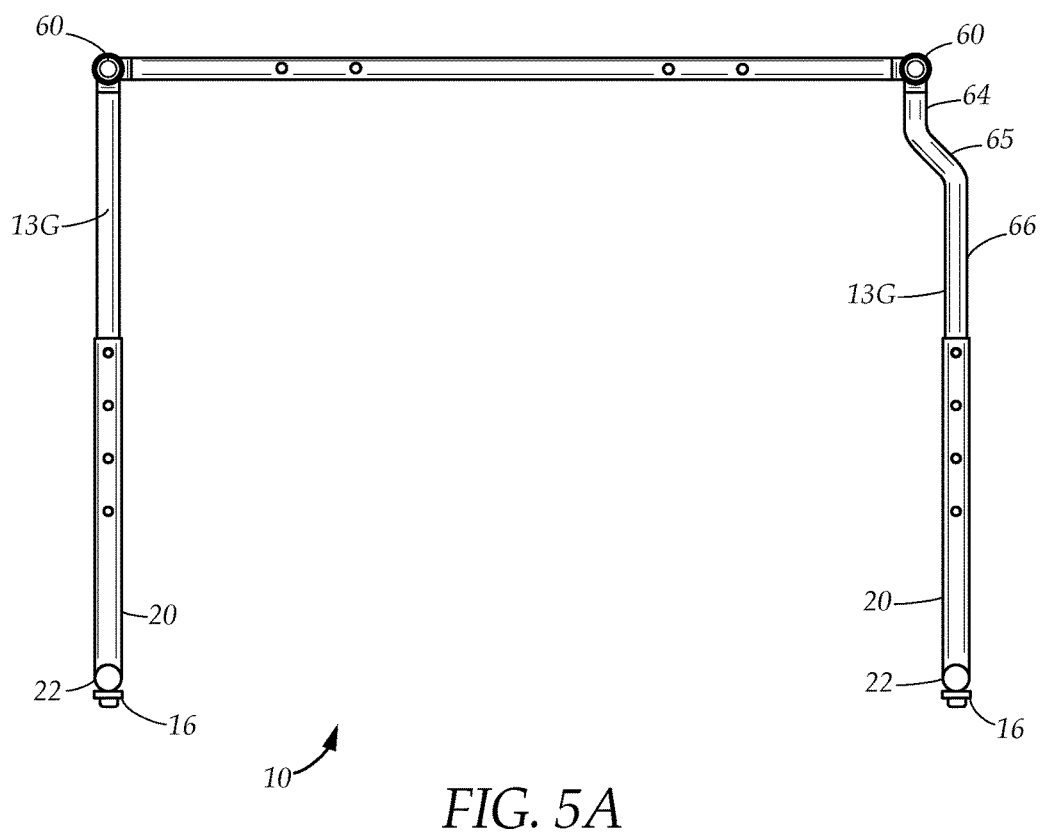
FIG. 5A is a front elevational view, showing the exercise device, wherein the lateral leg supports have been folded to be coextending with the base members as a first step in a folding sequence.
Figure 5B:
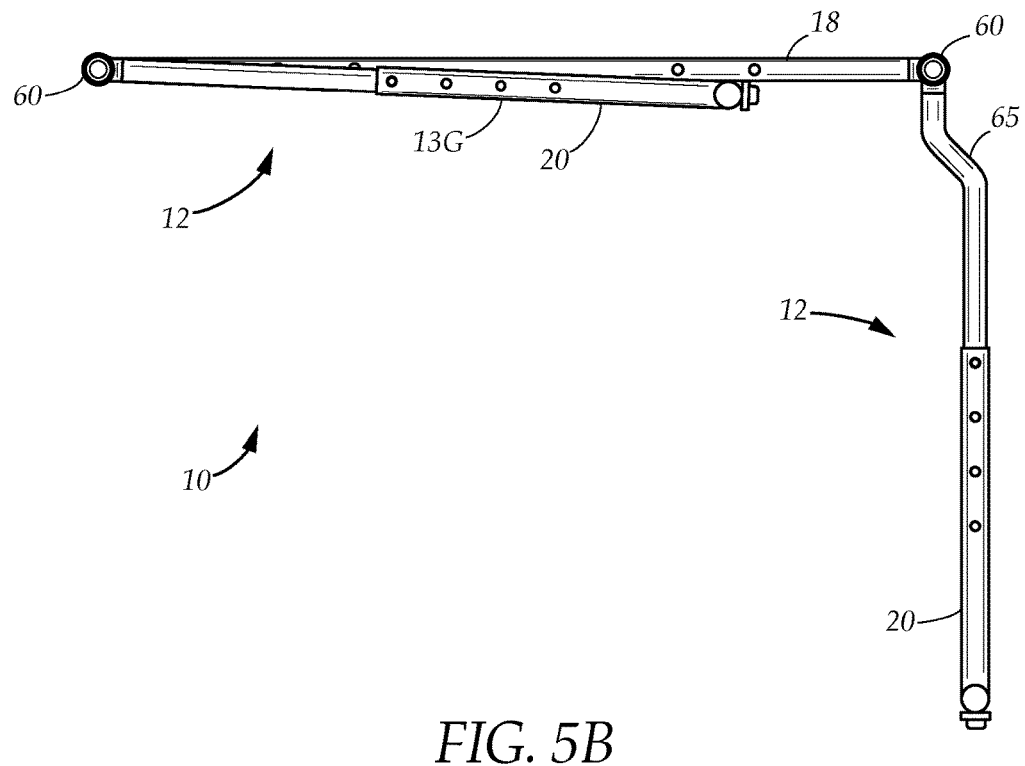
FIG. 5B is a front elevational view, wherein one of the upper tubes has been folded upwardly against the bridge to also bring its associated lower leg support against the bridge as a second step in the folding sequence.
Figure 5C:
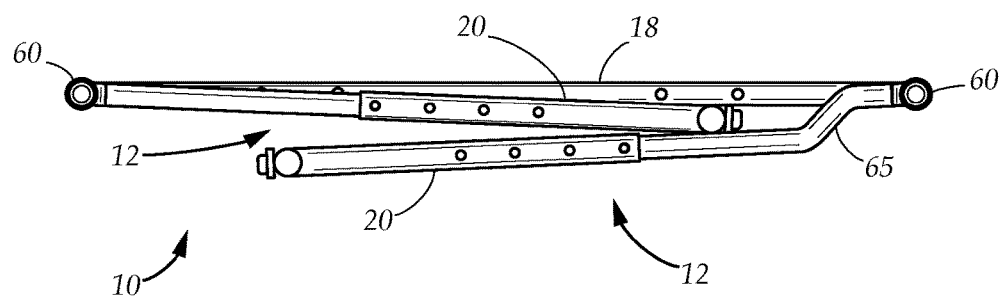
FIG. 5C is a front elevational view, wherein the other upper tube has been folded upwardly toward the bridge as a third step in the folding sequence.

Compact folding of the exercise device 10 into a storage position is shown in FIGS. 5A, 5B, and 5C. In particular, as illustrated in FIG. 5A, first the lateral leg supports 16 are folded by ninety degrees to extend parallel and coextensively with the base members 22. Then, as illustrated in FIG. 5B, the support mechanism 12 without the offset portion 65 is folded upwardly by folding the upper tube 13G thereof upwardly toward the bridge 18 until it extends nearly parallel thereto. Then, the support mechanism 12 having the offset portion 65 is folded upwardly toward the bridge 18. The offset portion 65 reduces interference between that support mechanism 12 and the support mechanism 12 already folded, to allow more compact folding of the exercise device 10 for storage.

Figure 6A:
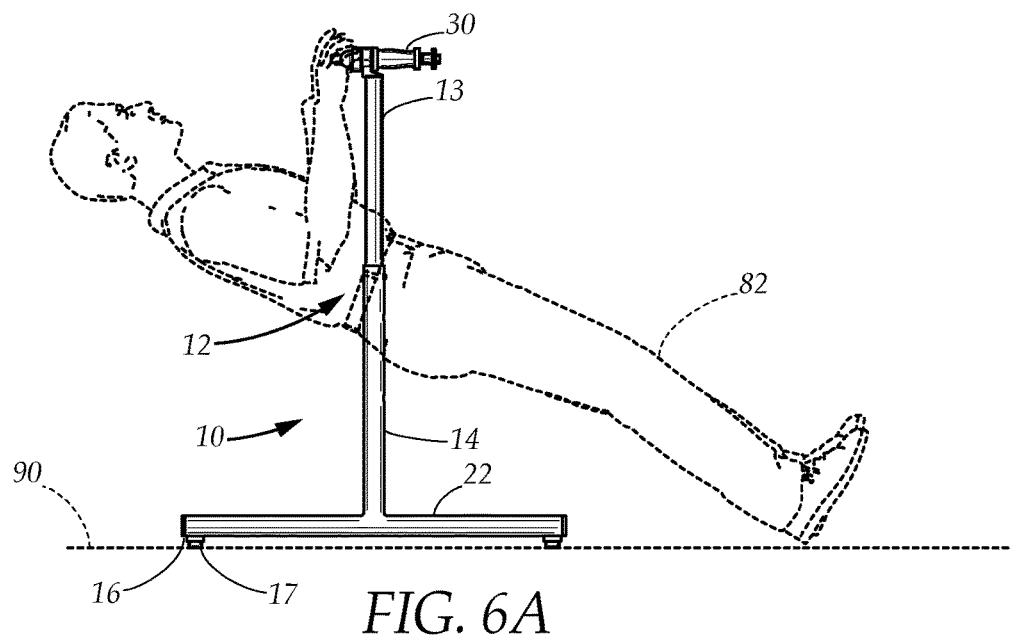
FIG. 6A is a side elevational view, illustrating the exercise device in use, wherein a user is performing a modified pull-up exercise by gripping the handgrips.
Figure 6B:
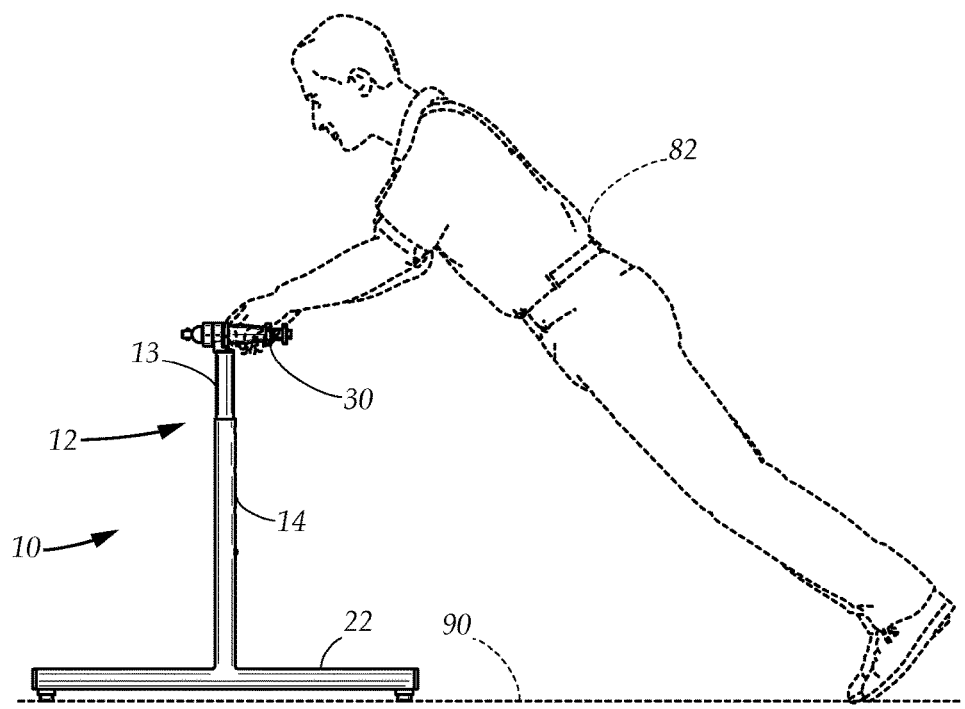
FIG. 6B is a side elevational view, illustrating the exercise device in use, wherein a user is performing a plank or push-up type exercise by gripping the handgrips.

As illustrated in FIGS. 6A and 6B, the exercise device 10 is positioned upon a ground surface 90, with the support mechanisms 12 extending vertically and the bridge 18 (not shown) extending horizontally therebetween. The base members 22 are supported upon the ground surface 90 by the lateral leg supports 16 and feet 17 therebeneath. A user 82 is holding the handgrip 30 and may perform a variety of exercises therewith, including modified pull-up exercises as illustrated in FIG. 6A, plank related exercises as shown in FIG. 6B, and numerous others. The height of the upper support 13 may be appropriately adjusted with respect to the lower support 14 as shown and as required by the exercises being performed and to suit the user.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an exercise device. The disclosure is illustrated by example in the drawing figures, and throughout the written description. It should be understood that numerous variations are possible, while adhering to the inventive concept. Such variations are contemplated as being a part of the present disclosure.

What is claimed is:

1. An exercise device, comprising:
   a bridge, having a pair of ends and having a pair of handgrip attachment holes;
   a pair of handgrips selectively attachable within the handgrip attachment holes;
   a pair of upper tubes;
   a pair of folding joints, each of the folding joints attaching one of the upper tubes to one of the ends of the bridge, such that the folding joints are configured to lock the upper tubes substantially perpendicularly to the bridge and parallel to each other, and are further configured to fold the upper tubes toward the bridge;
   a pair of lower supports, each lower support substantially T-shaped, having a central post and a base member having an upper surface, a lower surface, and a middle, the central post is secured to the middle of the base member, has height adjustment holes spaced thereon, and wherein one of the upper tubes extends vertically within said central post such that upper post telescopes within said central post.

2. The exercise device as recited in claim 1, wherein one of the upper tubes has a first part that is connected to the one of the folding joints, a second part that extends within central post, and an offset portion that is bent with respect to the first part and with respect to the second part while the first part extends parallel to the second part.

3. The exercise device as recited in claim 2, wherein the bridge has side edges; wherein the pair of handgrip attachment holes further comprises at least two pairs of handgrip attachment holes, each handgrip attachment hole extending between the side edges of the bridge, to provide flexibility of placement for the handgrips.

4. The exercise device as recited in claim 3, wherein each of the base members has a pair of ends; wherein each of the lower supports further comprise a pair of lateral support legs and a pair of pivot bolts, each lateral support leg having a pair of ends and a center; each lateral support leg pivotally attached to the lower surface of one of the base members near one of its ends using one of the pivot bolts extending through the center of said lateral support leg, each of the pivot bolts allowing its associated lateral support leg to selectively pivot between a deployed position wherein it extends perpendicular to the base member and a stored position wherein it extends coextensive and parallel to the base member.

5. The exercise device as recited in claim 4, wherein each of the handgrips having a molded grip, a shaft that extends through the molded grip and has a proximal end and distal end, a pair of retaining balls near the distal end that selectively extend outwardly to lock the handgrip to the bridge while the shaft extends through one of the handgrip attachment holes, and an actuation knob attached to the proximal end of the shaft for selectively retracting the balls into the shaft to allow the shaft to be removed from one of the handgrip attachment holes.

6. An exercise device, comprising:
   a bridge, having a pair of ends, a top edge, a bottom edge, and side edges, and having a pair of handgrip attachment holes that each extend fully between the side edges;
   a pair of upper tubes;
   a pair of folding joints, each of the folding joints attaching one of the upper tubes to one of the ends of the bridge, such that the folding joints are configured to lock the upper tubes substantially perpendicularly to the bridge and parallel to each other, and are further configured to fold the upper tubes toward the bridge;
   a pair of lower supports, each lower support substantially T-shaped, having a central post and a base member having an upper surface, a lower surface, a pair of ends, and a middle, the central post is secured to the middle of the base member, has height adjustment holes spaced thereon, and wherein one of the upper tubes extends vertically within said central post such that upper post telescopes within said central post, wherein each of the lower supports further comprise a pair of lateral support legs and a pair of pivot bolts, each lateral support leg having a pair of ends and a center, each lateral support leg pivotally attached to the lower surface of one of the base members near one of its ends using one of the pivot bolts extending through the center of said lateral support leg, each of the pivot bolts allowing its associated lateral support leg to selectively pivot between a deployed position wherein it extends perpendicular to the base member and a stored position wherein it extends coextensive and parallel to the base member; and
   a pair of handgrips, each handgrip having a molded grip and a shaft that extends through the molded grip, each handgrip selectively attachable to the bridge by extending the shaft of said handgrip through one of the handgrip attachment holes such that said handgrip extends parallel to the base members.

7. The exercise device as recited in claim 6, wherein the pair of handgrip attachment holes further comprises at least two pairs of handgrip attachment holes, each handgrip attachment hole extending between the side edges of the bridge, to provide flexibility of placement for the handgrips.

8. The exercise device as recited in claim 7, wherein one of the upper tubes has a first part that is connected to the one of the folding joints, a second part that extends within central post, and an offset portion that is bent with respect to the first part and with respect to the second part while the first part extends parallel to the second part.

9. The exercise device as recited in claim 8, wherein each of the handgrips having a molded grip, a shaft that extends through the molded grip and has a proximal end and distal end, a pair of retaining balls near the distal end that selectively extend outwardly to lock the handgrip to the bridge while the shaft extends through one of the handgrip attachment holes, and an actuation knob attached to the proximal end of the shaft for selectively retracting the balls into the shaft to allow the shaft to be removed from one of the handgrip attachment holes.

* * * * *